United States Patent [19]

Miki

[11] Patent Number: 5,906,262

[45] Date of Patent: May 25, 1999

[54] POSITIONING CONTROL SYSTEM FOR A NON-CONTACTING MAGNETIC CONVEYOR SYSTEM

[75] Inventor: Hiroshi Miki, Tokyo, Japan

[73] Assignee: Anelva Corporation, Fuchu, Japan

[21] Appl. No.: 09/007,790

[22] Filed: Jan. 15, 1998

[51] Int. Cl.[6] .................................................. B65G 35/00
[52] U.S. Cl. .......................... 198/341.02; 198/464.3; 198/502.3; 198/619; 198/465.2
[58] Field of Search ................. 198/614, 465.2, 198/464.3, 341.02, 502.3

[56] References Cited

U.S. PATENT DOCUMENTS

| | | | |
|---|---|---|---|
| 4,265,357 | 5/1981 | Amberg et al. | 198/464.3 |
| 4,832,181 | 5/1989 | Rugab et al. | 198/502.3 |
| 5,203,445 | 4/1993 | Shiraiwa | 198/464.3 |
| 5,377,816 | 1/1995 | Deligi et al. | |
| 5,437,359 | 8/1995 | Maruyama et al. | 198/464.3 |

FOREIGN PATENT DOCUMENTS 7-280060  10/1995  Japan .

*Primary Examiner*—Joseph E. Valenza
*Assistant Examiner*—Mark Deuble

*Attorney, Agent, or Firm*—Burns, Doane, Swecker & Mathis, LLP

[57] ABSTRACT

A positioning control system is used to control the stoppage of a conveyed article stably and with good repeatability with a magnetic conveyor system element on the receiving side when a conveyed article is passed between magnetic conveyor device elements in a noncontacting magnetic conveyor system configured from at least two magnetic conveyor system elements. The system comprises two independently operating magnetic conveyor system elements, and is provided with drive shafts 18A–18C, each of which has helical magnetic poles at its surface, and a guide path 14 along which a carrier 13 travels, and the carrier is equipped with magnetic poles of equal pitch to the pitch of the helical magnetic poles. When the rotary shafts rotate, the carrier moves over the guide path by a magnetic coupling action and is passed between the magnetic conveyor system elements. The system further includes a rotation angle sensor 34 which senses a specific rotation angle of the drive shaft, a position check sensor 35 which senses the reception of the carrier, and control units 32A and 32B which position the carrier when the sensing of both sensors 34, 35 has been performed synchronously.

3 Claims, 7 Drawing Sheets cross section 5-5' slot for double-helical shape

Fig. 6(B) cross section 6-6'

Fig. 6(C) slots for multi-helical shape stopping positions when sensed with a position check sensor only (conventional method)

stopping positions when sensed with synchronous sensing (the method of the present invention)

POSITIONING CONTROL SYSTEM FOR A NON-CONTACTING MAGNETIC CONVEYOR SYSTEM

BACKGROUND OF THE INVENTION

1. Field of the Invention

The present invention relates to a positioning control system for a noncontacting magnetic conveyor system, and in particular, it relates to a system that controls the positioning of a tray in a vacuum chamber on the receiving side when the tray is magnetically conveyed in a contact-free manner between vacuum chambers.

2. Description of Related Art

Rack and pinion mechanisms, roller drive mechanisms, and chain drive mechanisms have hitherto been widely employed when articles are conveyed in vacuum environments. These are called contacting transmission methods, in which the driving force is transferred by contacting action. Such drive mechanisms suffer from pronounced wear at the sliding parts in vacuum environments, where frictional coefficients are high and lubricating oil cannot be used. There has been a problem in that large quantities of dust particles (particulates) occur at the sliding parts. Furthermore, since the frictional coefficient is high, the clearance of the contacting parts must also be increased, and such drive mechanisms have obstructed the precise movement of trays.

However, a strong demand has arisen in recent years for a substantial reduction in the quantities of dust particles adhered to electronic components, typically semiconductor devices. Ideally a drive mechanism in which the occurrence of dust particles has been completely eliminated would be desirable. Various methods have already been proposed for conveyor systems with noncontacting transfer. Of these, the methods with a relatively simple structure are those that use magnetic coupling (referred to as "magnetic conveyor systems" in the following). Proposed magnetic conveyor systems include a linear conveyor mechanism using a helical magnetic circuit (U.S. Pat. No. 5,377,816 or 198/619 XR 414/217) and a magnetic screw used as a feed system in the field of machine tools (Unexamined Published Japanese Patent Application (JP-A) No. H7-280060).

The above-mentioned magnetic conveyor system that uses a helical magnetic circuit to perform linear conveying is equipped with a cylindrical rotary drive member having helical magnetic poles at its surface, and a conveyor path that conveys the moving body. The moving body is equipped with magnetic poles of the same pitch as the pitch of the helical magnetic poles. With such a mechanism, when the rotary drive member rotates, the moving body moves over the conveyor path according to the direction of rotation of the rotary drive member based on the magnetic coupling between the helical magnetic poles of the rotary drive member and the magnetic poles of the moving body.

In a substrate processing system, a tray loaded with one substrate, or with two or more substrates, is conveyed through each process chamber of a plurality of serially arranged process chambers and the substrates are processed in each process chamber. When the abovementioned noncontacting magnetic conveyor system is used to convey trays in such a substrate processing system, noncontacting magnetic conveyor system elements including the above-mentioned rotary drive member and conveyor path must be provided individually for each process chamber. When the tray is conveyed between process chambers in this sort of magnetic conveyor system, the tray must be passed over continuously and smoothly from the magnetic conveyor system element of one process chamber to the magnetic conveyor system element of the neighboring process chamber.

For continuous conveying, when a conveyed article such as a tray is passed over between two independent noncontacting magnetic conveyor system elements, the conveyed article must be stopped at a set position inside the process chamber in the magnetic conveyor system element that has received the conveyed article. Hitherto, pulse motors have been used to perform positioning control with high precision. Positioning with a conventional pulse motor involves determining the time at which the conveyed article is directly sensed by a sensor as the origin of the pulse motor of the magnetic conveyor system in the process chamber on the receiving side.

When a conveyed article is magnetically conveyed in a contact-free manner by magnetic conveyor system elements provided separately in each process chamber, there is no contact between the conveyed article and the rotary drive member when the conveyed article is passed between the magnetic conveyor system elements, and thus vibration (shaking) of the conveyed article occurs in the direction of travel due to inertia. As a result, errors arise in sensing the position of the conveyed article. With the conventional method whereby the conveyed article is sensed by just one sensor, errors (variation) have arisen with respect to the sensed stopping position. Furthermore, there have already been methods whereby a mechanical stopper projects out at the stopping position when a sensor has sensed the conveyed article approaching the stopping position, thereby forcing the conveyed article to stop at the stopping position. However, this has had drawbacks such as dust particles occurring due to collision between the conveyed article and the stopper, and wear occurring on the stopper.

OBJECTS AND SUMMARY

An aim of the present invention is to solve the above-mentioned problems by providing a positioning control system that can control the stoppage of the conveyed article stably and with good repeatability with the magnetic conveyor system element on the receiving side when the conveyed article is passed over between magnetic conveyor system elements in a noncontacting magnetic conveyor system comprising two or more magnetic conveyor system elements.

To achieve the above-mentioned objective, a positioning control system according to the present invention includes a noncontacting magnetic conveyor system comprising two or more independently operating conveyor stage elements, and includes a rotation angle sensor that senses a specific rotation angle of the rotary drive member of the conveyor stage element, a position check sensor that senses the reception of the moving body (e.g., a carrier loaded with substrates), and a control unit that positions the moving body. Also, the control unit may position the received moving body when it is simultaneously sensed by the rotation angle sensor and the position check sensor.

The conveyor stage elements may be provided with a rotary drive member having helical magnets at its surface and a conveyor path (e.g. , consisting of guide rods and rollers) that conveys the moving body. The moving body may be equipped with magnetic poles of equal pitch to the pitch of the helical magnetic poles. When the rotary drive member turns, the moving body moves over the conveyor path according to the direction of rotation of the rotary drive member based on the magnetic coupling between the helical magnetic poles of the rotary drive member and the magnetic poles of the moving body. The moving body also moves by being passed between conveyor stage elements. The moving body is linearly conveyed by the noncontacting magnetic conveyor system.

In the present invention, the positioning control of the carrier begins when the carrier is sensed by the position check sensor in the control unit in synchronization with the pulse sensing of the rotation of the rotary drive member by the rotation angle sensor. By synchronizing both types of sensing, the positioning control starts at the same time for any carrier that is conveyed. Even if vibration occurs in the direction of travel arising from the noncontacting coupling between the carrier and the rotary drive member, the carrier stoppage can be controlled stably and repeatably by the magnetic conveyor system element on the receiving side.

In the present invention, the rotation angle sensor preferably senses a specific rotation angle by using the rotation operation of a slotted disk fixed to the rotary transmission unit.

With the present invention, the stopping position of the conveyed article is usually the same even if vibration occurs in the direction of travel of the conveyed article arising from unstable noncontacting coupling between the conveyed article and the rotary drive member. The present invention controls the stopping of the conveyed article stably and repeatably. The present invention is able to control the stopping of the conveyed article by using an ordinary pulse motor control method. The conventional mechanical stopper becomes unnecessary.

DETAILED DESCRIPTION OF THE PREFERRED EMBODIMENTS

A preferred embodiment of the present invention is described below based on the accompanying figures.

A noncontacting magnetic conveyor system equipped with a positioning control system according to the present invention is suitable for a vacuum processing system having a plurality of process chambers that perform processes such as film deposition on substrates. The embodiment describes the application of the noncontacting magnetic conveyor system to a load-lock type in-line vacuum processing system made by the series connection of a plurality of process chambers. The noncontacting magnetic conveyor system may be used to move carriers (trays) loaded with substrates.

Figure 1:
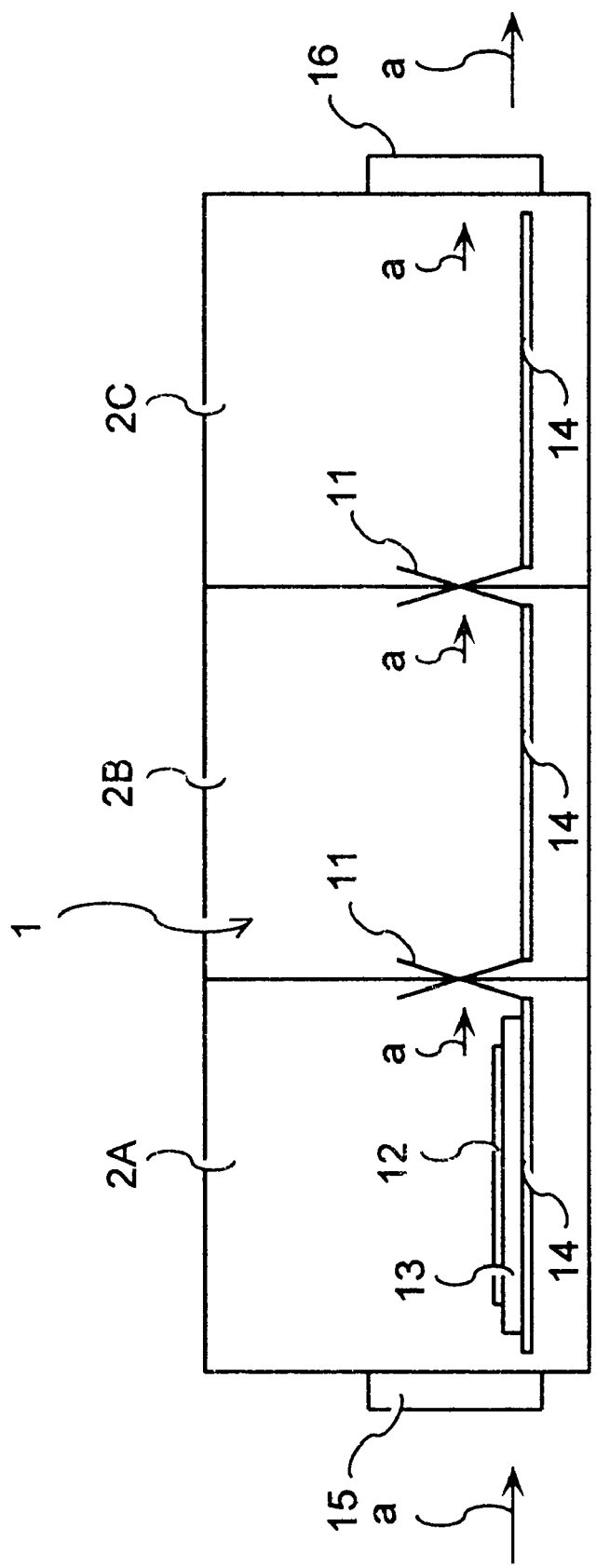
FIG. 1 is a side-view sketch showing a substrate processing system using a non contacting magnetic conveyor system according to the present invention.

In FIG. 1, a vacuum processing system 1 is equipped with three vacuum chambers (partitioned chambers) 2A, 2B and 2C, and a gate valve 11 is provided between each of the chambers. The interiors of each vacuum chamber 2A, 2B and 2C are pumped down to produce vacuum atmospheres. Each of the chambers is isolated from the others by a gate valve 11 to form vacuum processing modules. When the gate valve 11 is opened, the chambers are interconnected. Processing is performed on a workpiece conveyed into each chamber 2A, 2B and 2C through the opened gate valve 11. A carrier 13 loaded with a workpiece 12, such as a semiconductor substrate or a hard disk substrate, is sequentially conveyed through the gate valves 11 in the series-connected chambers 2A, 2B and 2C. The workpiece 12 brought into each chamber is stopped at a set position for processing inside each chamber.

Figure 2:
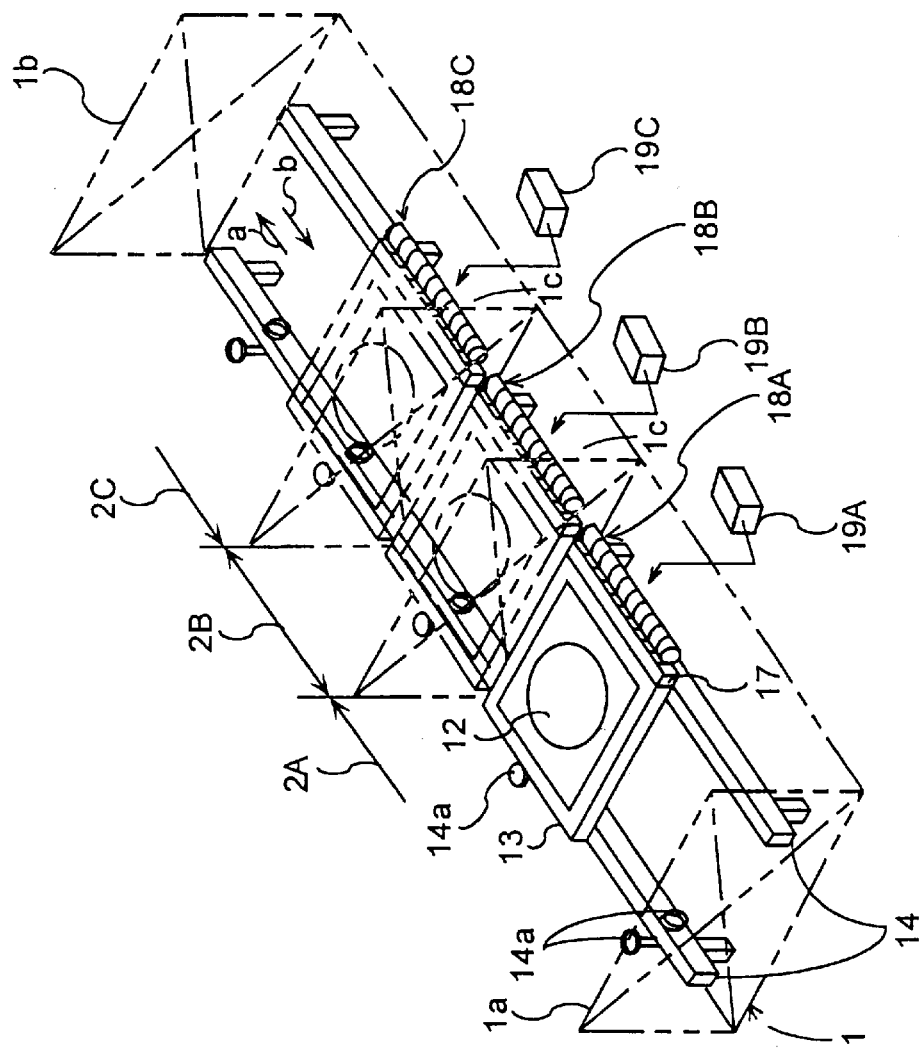
FIG. 2 is a sketch of an overall configuration of a noncontacting magnetic conveyor system according to the present invention.

The carrier 13, on which the workpiece 12 is loaded, moves along a pair of guide rods 14 provided on the underside. The two rail-shaped guide rods 14 are mounted in parallel beneath the carrier 13. A plurality of rollers 14a which support the carrier 13 are respectively disposed at fixed intervals at the sides and bottom of each of the two guide rods 14. The rollers of the guide rod 14 at the front of FIG. 2 are not illustrated. The carrier 13 is conveyed in a straight line by these guide rods 14.

The guide rods 14 are cut at the place where the gate valve 11 is provided. That is, the guide rods 14 are provided separately for each chamber. Drive systems (not illustrated in FIG. 1), such as motors for moving the carrier 13, are also provided separately for chambers 2A, 2B and 2C.

The carrier 13 first enters the interior of the chamber 2A from the entrance part 15 thereof, the gate valve 11 is then opened at a suitable timing, and then the carrier 13 is sent to the chamber 2B—passing through the gate valve 11—by a magnetic conveyor system which is described below. In the same way, the carrier 13 is sent in turn from the chamber 2B to the chamber 2C. In each chamber, processing is performed on the workpiece 12 retained on the carrier 13, which is in a stationary state. Finally, it is taken out from the exit part 16 of the chamber 2C. The way in which the carrier 13 and the workpiece 12 move in the vacuum processing system 1 is shown by arrow a.

FIG. 2 shows the carrier 13, which moves over the two guide rods 14 mounted in parallel. One workpiece (substrate) 12 or two or more workpieces (substrates) 12 are loaded on the carrier 13. When the carrier 13 is subjected to a driving force for movement, it is guided by the guide rods 14 equipped with rollers 14a as it moves. A slider 17 with a magnet part (which is described below) formed in its outer surface lies parallel to the guide rods 14 at the side part of the carrier 13. The slider 17 is subjected to a driving force from the magnet part of the rotary drive member (described below) through magnetic coupling, and moves so as to slide along a straight line (hence it is referred to as a "slider") If the slider 17 moves, the carrier 13, which is integral therewith, also moves with it. Accordingly, the carrier 13 moves by being subjected to a driving force from the said rotary drive member.

Rotary drive members 18A, 18B and 18C (referred to as "drive shafts" in the following) are mounted along the guide rods 14 in each of the three chambers 2A, 2B and 2C. The drive shafts 18A, 18B and 18C confer a driving force for moving the carrier 13, which is equipped with the slider 17, in a straight line. Each drive shaft has a cylindrical or tubular shape, and is pivoted so as to be free to rotate about the axis thereof.

Helically-mounted magnets are provided at the surfaces of the drive shafts 18A to 18C. Driving force is transmitted to these drive shafts 18A to 18C from pulse motors 19A, 19B and 19C, and the drive shafts are made to rotate in the direction of travel of the carrier. Driving forces are transmitted from pulse motors 19A–19C to drive shafts 18A–18C'.

Pulse motors 19A, 19B and 19C are UPK596-NBC pulse motors made by the Oriental Motor Corp., Tokyo, Japan, and are provided for each chamber. No synchronization control is performed between the drive shafts of each chamber, and the drive shafts 18A–18C of each chamber 2A to 2C are made to turn independently. Each of the drive shafts 18A to 18C is disposed adjacent to the slider 17 of the carrier 13 and facing it. The noncontacting magnetic conveyor system elements for the conveyor paths in each chamber 2A, 2B and 2C are configured from the guide rods, the drive shafts and pulse motors. These elements, which are connected in series, together form the noncontacting magnetic conveyor system.

Since the chambers are partitioned from each other by the above-mentioned gate valves 11, the gate valves 11 also partition the drive shafts from one another. Gaps are left between neighboring drive shafts. The length of the clearance (crossover part) between one drive shaft and the next is set much smaller than the length of the carrier 13. Due to the presence of these crossover parts, the carrier is passed between two magnetic conveyor system elements when it is moved from one drive shaft to the next.

In the vacuum processing system 1 shown in FIG. 2, item 1a is the front wall in which the above-mentioned entrance part 15 is provided, item 1b is the rear wall in which the above-mentioned exit part 16 is provided, and item 1c is the partition wall in which the above-mentioned gate valves 11 are provided. In chamber 2A, the carrier 13, the slider 17 and the workpiece 12 are drawn with solid lines, showing that the carrier 13 is inside chamber 2A. The carrier 13 is illustrated with imaginary lines in chambers 2B and 2C, showing how the carrier 13 in chamber 2A is conveyed to chambers 2B and 2C, in turn. The workpiece 12 is positioned in each chamber. Workpieces 12 are continuously conveyed, and a workpiece 12 exists in each of the chambers 2A to 2C, and processing can be performed on the workpiece in each of the chambers.

Figure 3:
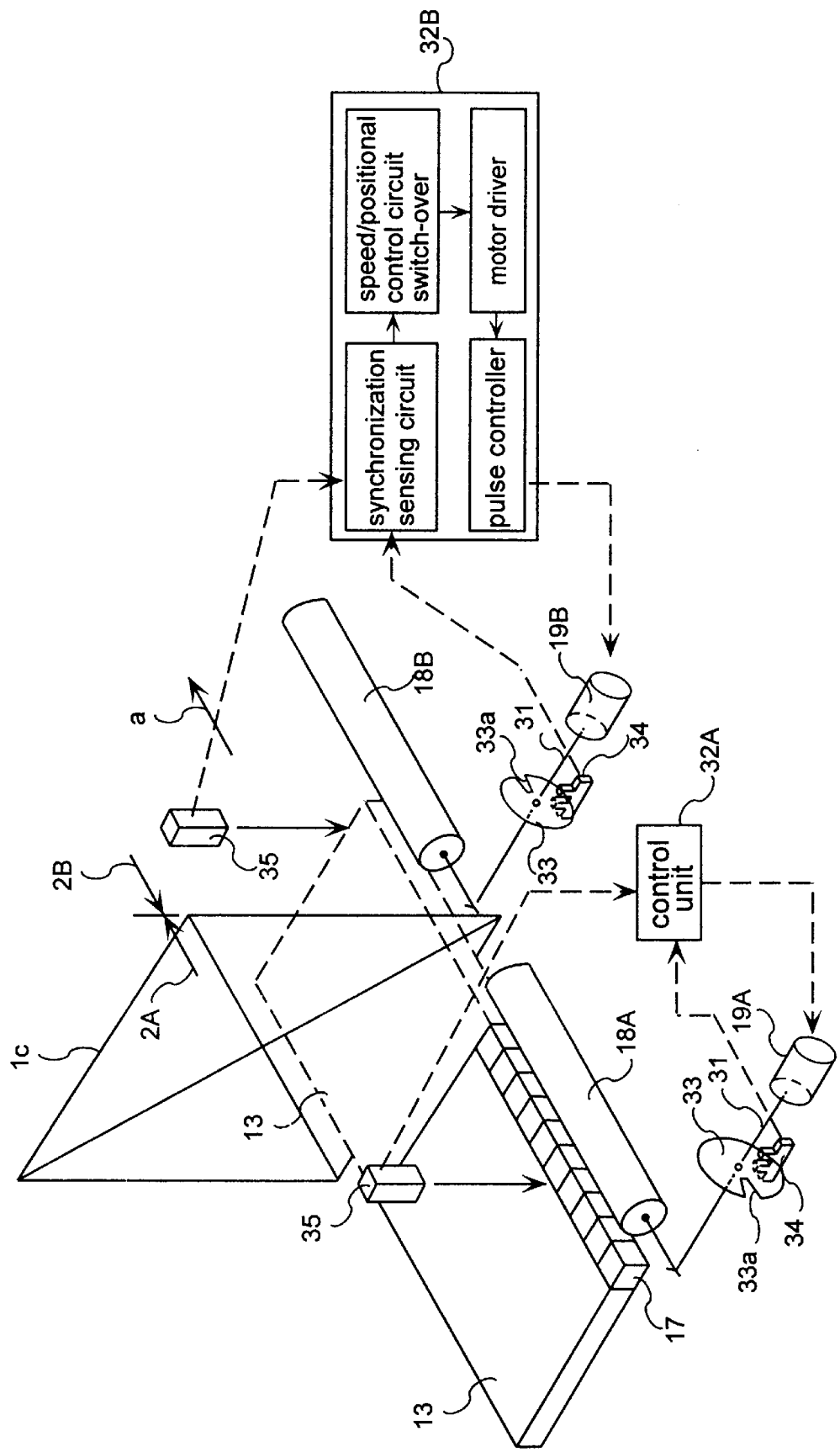
FIG. 3 is a sketch of the configuration of a noncontacting magnetic conveyor system in each chamber according to the present invention.

Details of the magnetic conveyor system elements in each chamber of the noncontacting magnetic conveyor system are described with reference to FIG. 3. FIG. 3 shows how the carrier 13 is conveyed as it is passes between two chambers 2A and 2B. As the figure shows, the drive shafts 18A and 18B are rotationally driven by pulse motors 19A and 19B, respectively. Item 31 is a drive transmission shaft. Pulse motors 19A and 19B are equipped with control units 32A and 32B. Control units 32A and 32B, respectively, consist of a synchronization sensing circuit, an "A1SD75" pulse controller which is made by Mitsubishi Electric Corp., Tokyo, Japan, and is equipped with a speed/positional control switch-over circuit, and a "UDK5114N" motor driver made by Oriental Motor Corp., Tokyo, Japan. The synchronization sensing circuit is usually a simple AND circuit.

The setting of control units 32A and 32B is switched over to either a mode where they are controlled at a constant rotation speed (abbreviated to "speed control mode" in the following) or a mode wherein the distance moved by the carrier is controlled according to a set number of pulses (abbreviated as "positional control mode" or "positioning control" in the following).

A slotted disk 33 in which a single slot 33a is formed is fixed to each of the drive transmission shafts 31. This slot 33a is for sensing the rotation angle of the drive shaft, and has a one-to-one transmission ratio with the drive shaft (drive shaft rotation vs. slot rotation). A sensor 34 for sensing the rotation angle (slot), abbreviated to "rotation angle sensor" in the following, is mounted adjacent the slotted disk 33. The rotation angle sensor 34 senses a certain specific rotation angle of the drive shafts 18A and 18B. A sensor 35, which senses the position of the carrier 13, (abbreviated to "position check sensor" in the following) is mounted in the vicinity of the entrances to chambers 2A and 2B.

In each chamber 2A and 2B, the sensing signals of the above-mentioned rotation angle sensor 34 and position check sensor 35 are input to the control units 32A and 32B. The control units 32A and 32B determine the control mode of the pulse motors 19A and 19B according to the conditions of the input sensing signals.

The conveying of the carrier 13 from the chamber 2A to the chamber 2B is described next. When the carrier 13 is conveyed into the chamber 2B, the pulse motors 19A and 19B are rotated in the speed control mode until the position check sensor senses the carrier 13, and the carrier 13 is made to move in direction a. The carrier 13 passes through the entrance of the chamber 2B, and is sensed by the position check sensor 35. After the carrier 13 has passed the position check sensor 35, the rotation angle sensor 34 senses the slot 33a in the slotted disk 33. The output signals of the position check sensor 35 and the rotation angle sensor 34 are input to the control unit 32B. Based on these output signals which it takes as its input, the control unit 32B outputs a signal instructing the pulse motor 19B to switch over from the speed control mode to the positional control mode. With this instruction signal, the operating mode of the motor 19B is switched over from the speed control mode to the positional control mode. Then, in this positional control mode, the carrier 13 comes to a standstill. Meanwhile, the carrier 13 is detached from the driving force of the drive shaft 18A in the chamber 2A, and positional control is performed only with the driving force of the drive shaft 18B in the chamber 2B.

Figure 4:
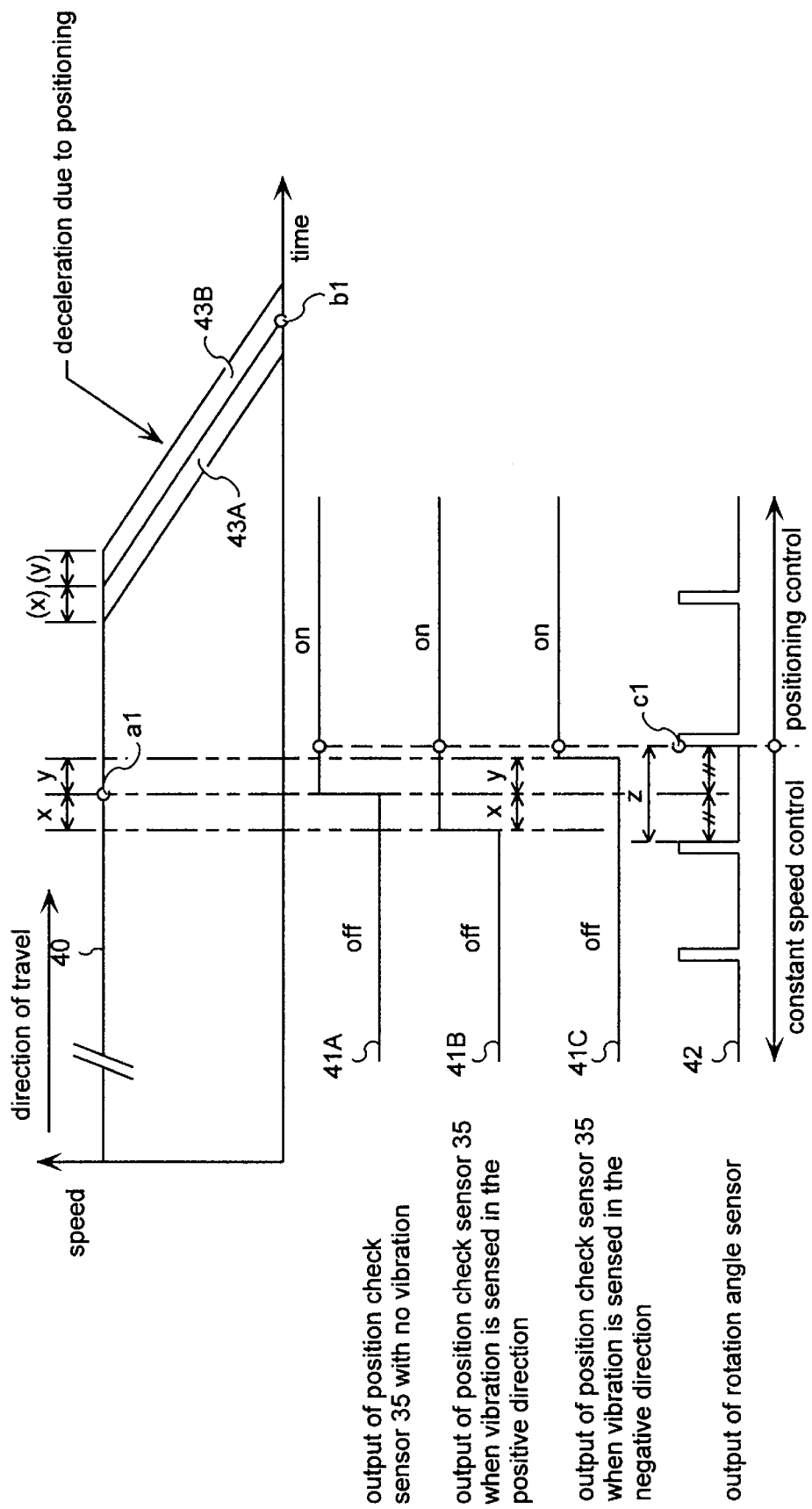
FIG. 4 is a timing chart of the operation of the rotation angle sensor and the position check sensor in the configuration shown in FIG. 3.

The relationship between the sensing operations of the position check sensor 35 and the rotation angle sensor 34 is described with reference to FIG. 4. In FIG. 4, a timing chart 40 shows the speed-time relationship during positioning control with an ordinary pulse motor. Point a1 shown in chart 40 is the time of the transition from the speed control mode to the positioning control mode when there is no vibration (shaking) of the carrier 13. Point b1 shows the time at which the positioning control mode ends, or in other words, the time at which the carrier 13 comes to a standstill. Accordingly, the area between point a1 and point b1 in graph 40 is the distance traveled by the carrier 13 in the positioning control mode. The distance traveled in the positioning control mode is constant. Thus, for the carrier 13 to always stop in the same position, the time at which the positioning control mode starts must always be made the same. In other words, by starting the control from a time at which this distance traveled is stable and reproducible, the position at which the carrier 13 comes to a standstill can be made more precise.

In the above-mentioned conventional method, point a1 was sensed only by a sensor for sensing the carrier position as shown by output 41A. Output 41A is the output signal that assumes there is no vibration in the direction of travel of the carrier. In practice however, since there is a noncontacting relationship between the drive shaft and the carrier, there is a tendency for vibration (shaking) to occur in the direction of travel of the carrier. When vibration has occurred, the carrier is either brought to a standstill with a shortfall of 43A in the distance by sensing vibration of the carrier in the positive direction with respect to the direction of travel of the carrier as shown by output signal 41B, or the carrier is brought to a standstill with an overshoot of 43B in the distance by sensing vibration of the carrier in the negative direction with respect to the direction of travel of the carrier as shown by output signal 41C.

The lowermost level of FIG. 4 also shows the output signal 42 of the rotation angle sensor 34 of the present embodiment. The sensed output of the rotation angle sensor 34 is output once per revolution of the drive shaft 18A. The sensed output of the position check sensor 35 when there is no vibration in the direction of travel of the carrier, which is shown by output 41A, is determined so as to be positioned in the middle between the pulses output from the rotation angle sensor 34.

In the present embodiment, when the carrier has been sensed by the position check sensor 35 and then by the rotation angle sensor 34, it is switched over from the speed control mode to the positioning control mode. The vibration range (X+Y) determined by the vibration in the positive direction shown by output signal 41B and the vibration in the negative direction shown by output signal 41C is accommodated within a dead zone (Z) between the output pulses of the rotation angle sensor 34. Since this vibration range (X+Y) lies within dead zone (Z), there is no switching over from the speed control mode to the positioning control mode even if the carrier 13 is sensed by the position check sensor 35 due to vibration. The control mode is switched over at sensing point c1 (datum point) at which the sensing of the position check sensor 35 and the sensing of the rotation angle sensor 34 are first synchronized. Since the control mode is switched over as soon as they are synchronized, this sensing point c1 (datum point)—that is, the point at which the control mode is switched over—is always the same point.

The reason why the distance traveled in the positioning control mode is constant can be explained as follows. For example, it will be assumed that Positioning control is performed with a pulse motor using a widely known ball screw. A nut is moved by pulse control to a position comprising the position used as a reference point (abbreviated to "origin" in the following). The number of turns made by the ball screw corresponding to the distance moved at this time is always constant. If the rotation angle of the origin is constant, then the rotation angle of the ball screw at the moved position must be constant. Accordingly, positioning with the ball screw involves determining the rotation angle of the ball screw when it starts to move, and turning the ball screw by a number of turns corresponding to the distance to be moved from this position. At a certain rotation angle of the rotary shaft, the position at which the nut lies is sensed at a single point in the direction of travel of the ball screw. In this way, control becomes possible for full positioning based on this sensed position. The positioning control system according to the present embodiment also brings the carrier accurately to a standstill inside the chamber so that control is performed for positioning on the same principle.

Although the above description has been concerned mainly with chamber 2B, the stopping positions at which the carrier 13 is stopped inside the chambers 2A and 2C are also controlled in the same way.

Next, an example of the slotted disk for sensing the rotation angle according to the helical magnetic poles of the drive shaft will be described with reference to FIG. 5 and FIG. 6.

Figure 5A:
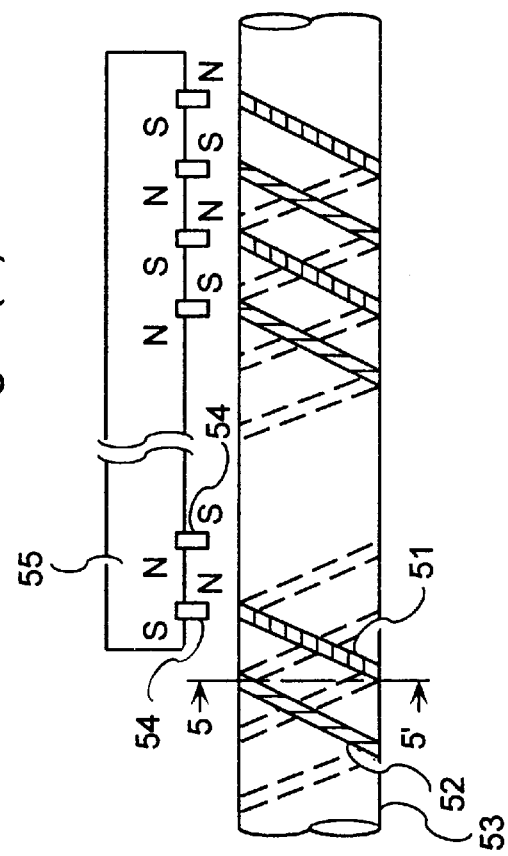
FIG. 5 is a figure showing the magnetic arrangement of a helical drive shaft and the associated slotted disk.
Figure 5B:
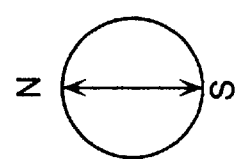
Figure 5C:
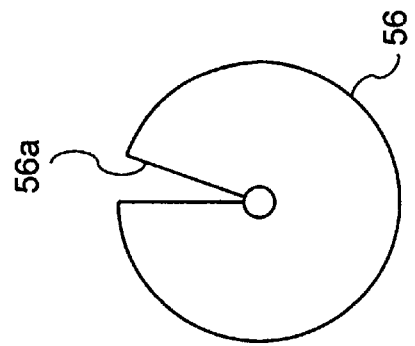

FIG. 5(A) shows the double-helical drive shaft 53 which has two magnetic poles, S pole 51 and N pole 52, arranged alternately at the surface of the drive shaft, and the slider 55, which is alternately provided with S and N magnetic poles 54 with the same pitch as the magnetic poles of this double-helical drive shaft 53. As FIG. 5(B) shows, this double-helical drive shaft 53 has magnetic pole S and magnetic pole N situated 180°apart on any cross section 5—5 '. To put it another way, magnetic pole S and magnetic pole N come back to the same positions if this double-helical drive shaft 53 performs a single rotation. Accordingly, slotted disk 56 is equipped with a slot (cut-out) 56*a* for sensing one position on its circumference as shown in FIG. 5(C).

Figure 6A:
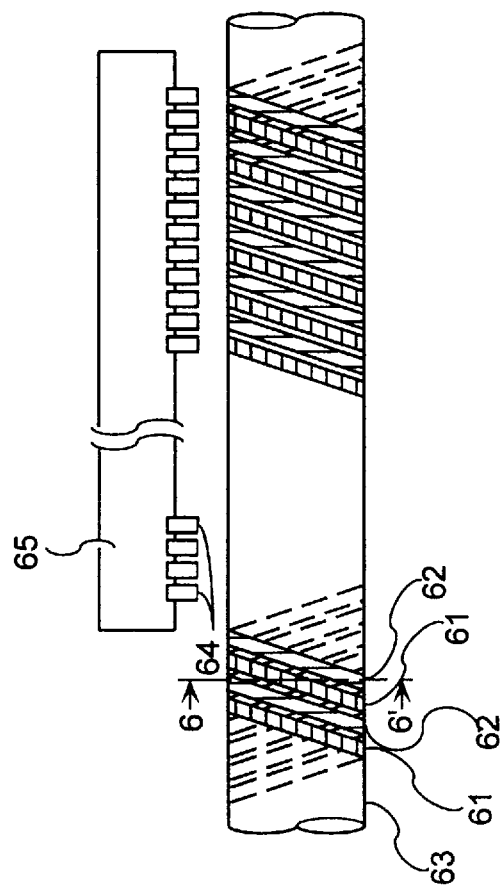
FIG. 6 is a figure showing the magnetic arrangement of another helical drive shaft and the associated slotted disk.
Figure 6A:
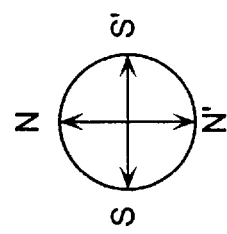
Figure 6A:
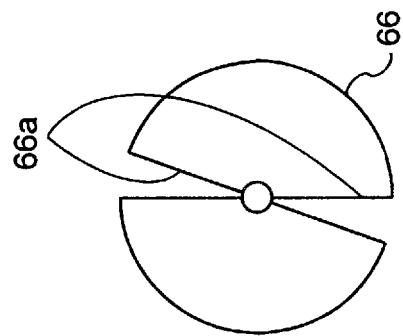

As an alternative to the above, FIG. 6(*a*) shows a multi-helical drive shaft 63 which has dual S poles 61 and dual N poles 62 disposed alternately at the surface of the drive shaft, and a slider 65 provided with alternating S and N magnetic poles 64 with the same pitch as the magnetic poles of this multi-helical drive shaft 63. As FIG. 6(B) shows, this double-helical drive shaft 63 has the same magnetic poles situated 180° apart on any cross section 6—6'. When this drive shaft 63 rotates 180°, the magnetic poles S and the magnetic poles N come back to the same positions. Accordingly, as shown in FIG. 6(C), two slots 66*a* are formed 180° apart in the circumference of slotted disk 66. When the carrier is passed between two drive shafts, the slider 65 of the carrier is engaged in a contact-free manner to either of two positions 180° apart on multi-helical drive shaft 63. In this case, the slider 65 can thus stop at two positions with respect to the multi-helical drive shaft 63. In the same way, in the assembly of the multi-helical drive shaft 63 and the slider 65, if the multi-helical drive shaft 63 and the slotted disk 66 are changed to a one-to-two transmission ratio, it is also possible to use a slotted disk for rotational position sensing having a sensing slot in one place on its circumference.

Figure 7A:
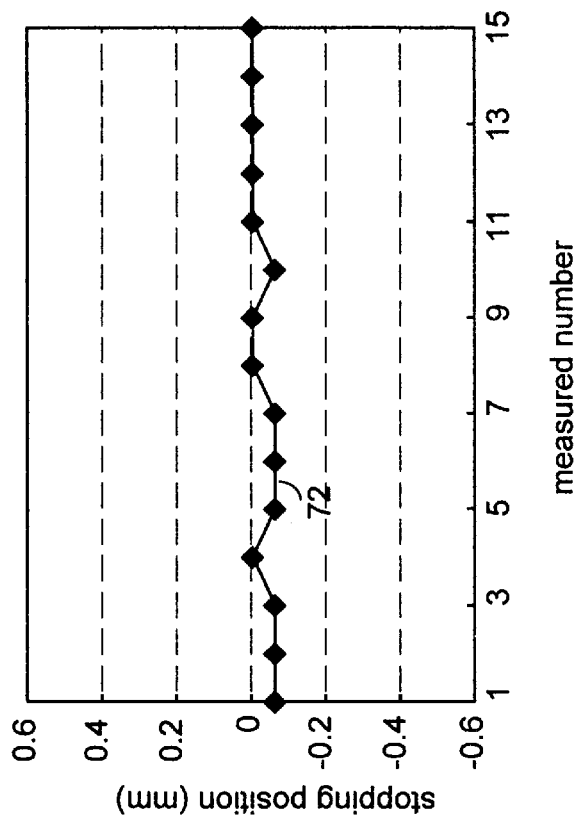
FIG. 7 is a graph comparing the carrier stopping positions of a conventional method with those of the method according to the present invention.
Figure 7B:
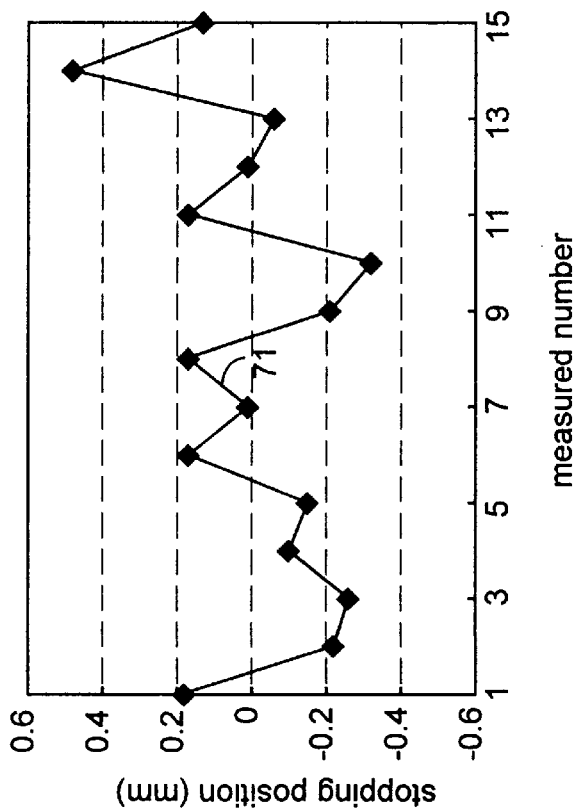

FIG. 7 shows the measured results of the carrier stopping position with positioning control in the conventional sensing method where only a carrier position check sensor is used, and the stopping position of the same carrier with positioning control using the synchronous method of the present invention. These measurements were made by image processing using a CCD camera. As the measured results 71 and 72 clearly show, the stopping positions are scattered over a width of about 0.8 mm with the conventional method. With the method of the present invention, the scattering width could be held down to within about 0.06 mm.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A positioning control system for a noncontacting magnetic conveyor system, which noncontacting magnetic conveyor system has a nonlinear conveyor stage that conveys a moving body and includes at least first and second independently operating conveyor stage elements, the first and second conveyor stage elements each being provided with a rotary drive member having helical magnetic poles at its surface and a conveyor path along which the moving body is conveyed, the moving body being equipped with magnetic poles, and wherein, when said rotary drive member rotates, said moving body moves over said conveyor path according to the direction of rotation of said rotary drive member based on the magnetic coupling between said helical magnetic poles of said rotary drive members and said magnetic poles of said moving body, and also moves by being passed between said first and second conveyor stage elements, the control system comprising:

a rotation angle sensing means that senses a specific rotation angle of said rotary drive member associated with the second conveyor stage element as the moving body moves from the first conveyor stage element to the second conveyor stage element, a position check sensor that senses reception of said moving body at the second conveyor stage element, and control means that positions the moving body when it is simultaneously sensed by said rotation angle sensing means and said position check means.

2. The positioning control system for a noncontacting magnetic conveyor system according to claim 1, wherein said rotation angle sensor includes a slotted disk fixed to a rotary transmission unit to sense the specific rotation angle.

3. The positioning control system for a noncontacting magnetic conveyor system according to claim 1, wherein the magnetic poles of the moving body have a pitch equal to a pitch of said helical magnetic poles of the rotary drive member.

* * * * *